US007387098B2

(12) United States Patent
Waseda et al.

(10) Patent No.: US 7,387,098 B2
(45) Date of Patent: Jun. 17, 2008

(54) CAM FOLLOWER

(75) Inventors: Yoshitaka Waseda, Nisshin (JP); Shinya Ochi, Hamura (JP)

(73) Assignee: Jtekt Corporation, Osaka-shi, Osaka (JP)

( * ) Notice: Subject to any disclaimer, the term of this patent is extended or adjusted under 35 U.S.C. 154(b) by 0 days.

(21) Appl. No.: 11/489,714

(22) Filed: Jul. 20, 2006

(65) Prior Publication Data

US 2007/0022992 A1 Feb. 1, 2007

(30) Foreign Application Priority Data

Jul. 21, 2005 (JP) ........................... P2005-211143

(51) Int. Cl.
*F01L 1/14* (2006.01)

(52) U.S. Cl. ............................... 123/90.51; 123/90.48; 123/90.44; 74/569

(58) Field of Classification Search ............. 123/90.51, 123/90.48, 90.44; 74/569
See application file for complete search history.

(56) References Cited

U.S. PATENT DOCUMENTS

| | | | | |
|---|---|---|---|---|
| 5,333,954 | A | 8/1994 | Noguchi et al. | |
| 5,643,054 | A | 7/1997 | Bach et al. | |
| 5,823,861 | A | 10/1998 | Kobayashi et al. | |
| 2005/0160602 | A1* | 7/2005 | Shibata et al. | 29/898.066 |

FOREIGN PATENT DOCUMENTS

| | | |
|---|---|---|
| EP | 0 334 945 B1 | 10/1989 |
| EP | 0 649 705 A1 | 4/1995 |
| JP | 2594339 | 12/1996 |
| JP | 2634496 | 4/1997 |
| JP | 2656404 | 5/1997 |
| JP | 2000-073712 | 3/2000 |
| JP | 3125434 | 11/2000 |
| JP | 3146696 | 1/2001 |
| JP | 3146697 | 1/2001 |
| JP | 2004-332896 | 11/2004 |

OTHER PUBLICATIONS

European Search Report dated Dec. 5, 2006.
http://www.finishingassociates.com/content/view/14/31/.
http://www.finishingassociates.com/content/view/111/43/.
http://www.brator.sinto.co.jp/global/dry.html.
http://www.qualitydigest.com/june01/html/surface.html.
European Search Report dated Dec. 28, 2007.

* cited by examiner

*Primary Examiner*—Zelalem Eshete
(74) *Attorney, Agent, or Firm*—McGinn IP Law Group, PLLC

(57) ABSTRACT

A cam follower includes a roller on which a cam rolls. A material ratio Rmr (C) (C: a section level %) of an radially outer surface of the roller is set to relations of 0%<Rmr (10%)≦10%, a Kurtosis Rku of a roughness profile of the outer surface is set to 4≦Rku≦10, an arithmetic mean roughness Ra of the outer surface is set to 0<Ra≦0.15, and a compression stress S of the outer surface is set to 800 MPa≦S≦1,100 MPa.

3 Claims, 1 Drawing Sheet

CAM FOLLOWER

BACKGROUND OF THE INVENTION

The present invention relates to a cam follower for constituting a valve mechanism of an engine.

In recent years, a valve mechanism for transmitting the motion of a cam, which is fixed on a cam shaft to rotate together with the crankshaft of an engine, to a valve is reduced in frictional loss to a low level by assembling a cam follower into the valve mechanism thereby to change the friction at the running time of the valve mechanism from a sliding friction to a rolling friction.

Here, of the engine parts, lubricating property of the cam portion is severe, and its contact face is called the boundary lubricant area. In the cam follower with the roller to be used under this condition, the roller basically makes a rolling contact with the cam, but the pure rolling contact is impossible because of the change in the rotational speed of the roller due to the cam shape or the abrupt fluctuation of the load acting on the roller. Thus, the cam follower makes a rolling contact accompanied by the slip. In relation to the lubricating conditions (on quantity and temperature of oil and on a foreign substance) and the surface roughness of the mating cam, the peeling phenomenon arises on the outer rolling face of the roller, thus raising a problem that the cam follower has a short lifetime.

In order to improve the durability of the radially outer surface of the roller of the cam follower to make the rolling or sliding contact with the cam in use, various inventions (as referred to Patent Documents 1 and 2, for example) have been known on the improvements in the surface properties.

In Patent Document 1, an arrangement in which the radially outer surface of the roller is prevented from being peeled, by forming a number of small recesses for oil reservoirs is disclosed.

In Patent Document 2, an arrangement in which the durability is improved to prevent the peeling by enhancing the hardness on the radially outer surface of the roller is disclosed.

Patent Document 1: Japanese Patent No. 2,594,339

Patent Document 2: Japanese Patent No. 3,125,434

However, the arrangements of Patent Documents 1 and 2 could prevent the peeling of the roller, but still have a problem that the cam surface is worn if the cam is made of a material weaker than that of the roller.

In the arrangement of Patent Document 1, specifically, the radially outer surface of the roller is made rough by a machine such as a centrifugal barrel of high working power, so that the roughness becomes seriously coarse. When the roller makes the rolling or sliding contact with the cam, the roughness of its radially outer surface wears the cam surface. At the time of barreling treatment, moreover, the roughness is formed not only on the radially outer surface but also on the radially inner face of the roller. This raises another problem that the member to be contacted by the radially inner face of the roller, such as the rollers of a bearing are worn.

In the arrangement of Patent Document 2, on the other hand, the radially outer surface of the roller is made so drastically hard as to increase the difference in hardness from that of the cam surface. This raises another problem that the cam surface is worn.

The arrangement of Patent Document 1 may be modified such that the radially outer surface is subjected to an SF (Super Finishing) treatment thereby to reduce the surface roughness and to improve the coarseness. However, the axial end faces of the roller are not subjected to the SF treatment so that they are rough. This raises a problem that the inner wall of the holder of the cam follower to be contacted by the axial end faces of the roller is worn out.

SUMMARY OF THE INVENTION

Therefore, an object of the invention is to prevent the individual portions of the cam surface or cam follower to be contacted by the roller from being worn.

In order to achieve the object, the present invention is characterized by having the following arrangements.

(1) A cam follower comprising:

a roller on which a cam rolls, wherein a material ratio Rmr (C) (C: a section level %) of an radially outer surface of the roller is set to relations of $0\% < \mathrm{Rmr}\ (10\%) \leqq 10\%$, a Kurtosis Rku of a roughness profile of the outer surface is set to $4 < \mathrm{Rku} \leqq 10$, an arithmetic mean roughness Ra of the outer surface is set to $0 < \mathrm{Ra} \leqq 0.15$, and a compression stress S of the outer surface is set to $800\ \mathrm{MPa} \leqq S \leqq 1{,}100\ \mathrm{MPa}$.

(2) The cam follower according to (1), wherein an arithmetic mean roughness Ra on an axial end face of the roller is set to $0 < \mathrm{Ra} \leqq 0.8$.

(3) The cam follower according to (1), wherein a surface treatment of the roller is performed by a flow-barreling.

According to the cam follower thus constituted, the material ratio Rmr (C) (C: the section level %) is set to satisfy the relations of $0\% < \mathrm{Rmr}\ (10\%) \leqq 10\%$. As a result, the roughness can be reduced to raise the ratio of the flat portion thereby to prevent the wear of the cam surface by the radially outer surface of the roller.

The Kurtosis Rku of the roughness profile on the radially outer surface of the roller is set within $4 \leqq \mathrm{Rku} < 10$. As a result, the more portion to bear the load can be retained to prevent the wear of the radially outer surface of the roller.

The arithmetic mean roughness Ra on the radially outer surface of the roller is set to $0 < \mathrm{Ra} \leqq 0.15$. As a result, the oil film can be easily retained to prevent the separation of the surface layer.

The compression stress S of the surface layer portion is set to $800\ \mathrm{MPa} \leqq S \leqq 1{,}100\ \mathrm{MPa}$. As a result, the fatigue strength of the bearing can be enhanced.

The arithmetic mean roughness Ra on the axial end face 3*c* of the roller 3 is set to $0 < \mathrm{Ra} \leqq 0.8$. As a result, the wear of the individual portions of the cam follower, against which the axial end faces of the roller abut, can be prevented, and the oil film can be retained to prevent the separation of the surface layers.

According to the invention, the cam follower is not subjected to such a work, e.g., a centrifugal barreling or a shotpeening as to deform the surface largely, so that the individual portions of the cam surface or the rocker arm can be prevented from worn by the roughness of the roller surface.

DETAILED DESCRIPTION OF PREFERRED EMBODIMENTS

Preferred embodiment of the invention is described with reference to FIG. 1 and FIG. 2.

Figure 1:
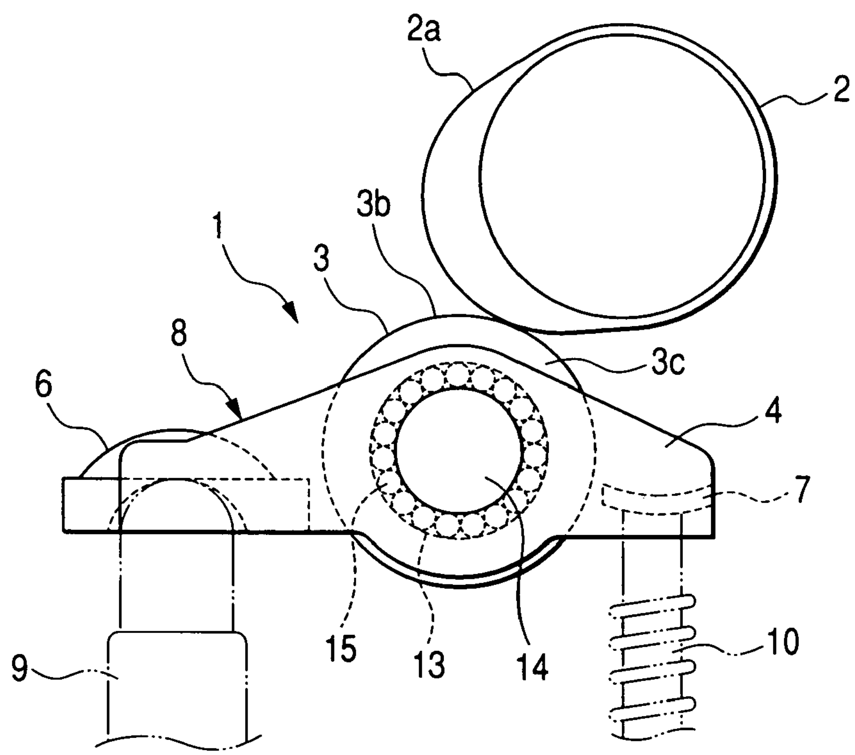
FIG. 1 is a side elevation of a rocker arm according to an embodiment of the invention.
Figure 2:
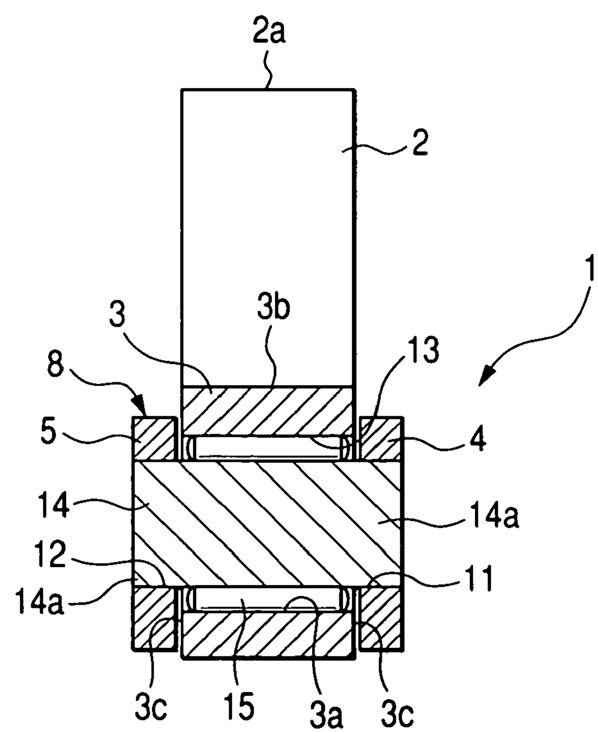
FIG. 2 is a sectional view of the rocker arm according to the embodiment of the invention.

FIG. 1 is a side elevation of a rocker arm, and FIG. 2 is a sectional view of the rocker arm.

A rocker arm 1 as a cam follower according to an embodiment of the invention is arranged in a predetermined position of an OHC valve mechanism in the engine of a vehicle. Numeral 2 designates a cam, which is arranged at a predetermined position of the engine valve mechanism. The rocker arm 1 includes a roller 3, on which the cam 2 rolls in abutment, and a pair of opposed walls 4 and 5, which are opposed to each other through that roller 3. These opposed walls 4 and 5, and connecting walls 6 and 7 connecting the opposed walls 4 and 5 to each other on the two longitudinal sides constitute a holder 8. One connecting wall 6 is used as a pivot receiving portion, against which the upper end portion of a rush adjuster 9 abuts, and the other connecting wall 7 is used as a valve stem receiving portion, in which the upper end portion of a valve stem 10 is received.

Support holes 11 and 12 are coaxially formed in the two opposed walls 4 and 5 respectively at their longitudinally intermediate portions. The roller 3 is arranged between the two opposed walls 4 and 5 and is formed with a shaft hole 13 of a circular shape in section, which is located at a radially central portion and axially extends through the roller. A solid shaft member 14 extends between the support holes 11 and 12 so that two end portions 14*a* thereof are irrotationally supported. The shaft member 14 is so caulked while being fitted in the two support holes 11 and 12 that its two end portions 14*a* may be radially enlarged. As a result, the shaft member 14 is press-fitted in the circumferential walls of the support holes 11 and 12 so that it is irrotationally supported in the opposed walls 4 and 5.

The radially inner face of the roller 3 provides an outer raceway surface 3*a*, and the radially outer surface of the shaft member 14 provides an inner raceway surface 14*b*. A plurality of rollers 15 are rollably disposed around the shaft member 14, and the cam 2 is turned on the radially outer surface 3*b* of the roller 3, so that the roller 3 rotates on its axis. In short, the bearing unit is the full roller type having no retainer.

In the rocker arm 1 as described above, as the cam 2 rotates in association with the rotation of the crankshaft, the roller 3 in abutment against the cam 2 rotates on the shaft member 14, and the holder 8 is rocked around the pivot receiving portion thereby to open/close the valve disposed in the not-shown cylinder head.

The method for manufacturing the roller 3 is described below. At first, a cylindrical drawn material is used as a base material, and this base material is subjected at its center to a plurality of forging treatments thereby to form a center hole. Next, the base material having the center hole is subjected at its two end faces to an extruding processing thereby to form the roller body.

After this, the roller body is subjected to a flow-barreling treatment. In the flow-barrel, when a disk in a polishing bath is turned, the mass charged in the bath is brought to the outer wall side due to the centrifugal force so that it rises along the outer wall to a height according to the rotational speed. The mass loses the centrifugal force in the upper portion of the bath so that it returns from the upper portion to the bottom portion. By repeating these motions, a helical (or toroidal) slipping flow layer is formed. By pouring the work into the slipping flow layer, the media and the work grind each other to polish the work.

Thus, not the working method using the centrifugal barrel or the shotpeening to deform the surfaces seriously, but the flow-barreling method using the weak working force is used. Thus, it is possible to reduce the roughness of the roller surface thereby to prevent the wears of a cam surface 2*a*, against which the radially outer surface 3*b* of the roller 3 comes into contact, and the holder 8 of the rocker arm 1. Unlike the working method of the related art, moreover, no SF treatment is required after the surface modification, so that the modified layer is not removed from the surface and the compression stress of the outermost surface can be formed to have a high compression stress.

Specifically, as to the radially outer surface 3*b* of the roller 3, on which the cam 2 rolls in contact, a material ratio Rmr (C) (C: a section level %), as defined in JIS R 0601, satisfies relations of $0\% < \mathrm{Rmr}\ (10\%) \leqq 10\%$.

As to the radially outer surface 3*b* of the roller 3, the Kurtosis Rku of a roughness profile, as defined in JIS B 0601, satisfies relations of $4 \leqq \mathrm{Rku} \leqq 10$.

As to the radially outer surface 3*b* of the roller 3, the arithmetic mean roughness Ra, as defined by JIS B 0601, satisfies relations of $0 < \mathrm{Ra} \leqq 0.15$.

The surface layer portion of the roller 3 has a compression stress S satisfying relations of $800\ \mathrm{MPa} \leqq S \leqq 1{,}100\ \mathrm{MPa}$.

At the axial end face 3*c* of the roller 3, the arithmetic mean roughness Ra, as defined by JIS B 0601, has relations of $0 < \mathrm{Ra} \leqq 0.8$.

Here, the differences between the arithmetic mean roughness of $0 < \mathrm{Ra} \leqq 0.15$ on the radially outer surface 3*b* of the roller 3 and the arithmetic mean roughness of $0 < \mathrm{Ra} \leqq 0.8$ on the axial end face 3*c* of the roller 3 generally come from the difference in the working method between the radially outer surface 3*b* and the axial end face 3*c*, so that their roughness difference can be accordingly made.

Here, the flow-barreling treatment is performed by mixing media larger than the internal diameter of the center hole of the roller body with steel balls. By thus using the media larger than the internal diameter of the center hole and the steel balls, the center hole has its radially inner face left unworked. As a result, the radially inner face 3*a* of the roller is not made excessively rough so that the rollers 15 can be prevented from being worn. In the compression stress, the radially outer surface 3*b* to be hit by the media is set minus with respect to the radially inner face 3*a*. Moreover, the hardness resulting from the working is higher on the radially outer surface 3*b* than on the radially inner face 3*a* thereby to establish a sufficient durability.

According to the cam follower thus constituted, the material ratio Rmr (C) (C: the section level %) is set to satisfy the relations of $0\% < \mathrm{Rmr}\ (10\%) \leqq 10\%$. As a result, the roughness can be reduced to raise the ratio of the flat portion thereby to prevent the wear of the cam surface 2*a* by the radially outer surface 3*b* of the roller 3.

Moreover, the Kurtosis Rku of the roughness profile on the radially outer surface 3*b* of the roller 3 is set within $4 \leqq \mathrm{Rku} \leqq 10$. As a result, the more portion to bear the load can be retained to prevent the wear of the radially outer surface 3*b* of the roller 3.

Moreover, the arithmetic mean roughness Ra on the radially outer surface 3*b* of the roller 3 is set to $0 < \mathrm{Ra} \leqq 0.15$. As a result, the oil film can be easily retained to prevent the separation of the surface layer.

Moreover, the compression stress S of the surface layer portion is set to $800\ \mathrm{MPa} \leqq S \leqq 1{,}100\ \mathrm{MPa}$. As a result, the fatigue strength of the bearing can be enhanced.

Moreover, the arithmetic mean roughness Ra on the axial end face 3*c* of the roller 3 is set to $0 < \mathrm{Ra} \leqq 0.8$. As a result, the wear of the inner faces of the opposed walls 4 and 5 of the holder 8, against which the axial end faces 3*c* of the roller 3 abut, can be prevented, and the oil film can be retained to prevent the separation of the surface layers.

Here, the cam follower should not be limited to the rocker arm of the OHC valve mechanism but may also be exemplified by a rocker arm, which is associated with the upper end of the push rod to be moved up and down by the cam in an OHV valve mechanism.

The invention is useful as the cam follower to constitute the valve mechanism of an automotive engine.

What is claimed is:

1. A cam follower comprising:

a roller on which a cam rolls, wherein a material ratio Rmr (C) (C: a section level %) of an radially outer surface of the roller is set to relations of $0\% < Rmr\ (10\%) \leqq 10\%$, a Kurtosis Rku of a roughness profile of the outer surface is set to $4 \leqq Rku \leqq 10$, an arithmetic mean roughness Ra of the outer surface is set to $0 < Ra \leqq 0.15$, and a compression stress S of the outer surface is set to $800\ MPa \leqq S \leqq 1{,}100\ MPa$.

2. The cam follower according to claim 1, wherein an arithmetic mean roughness Ra on an axial end face of the roller is set to $0 < Ra \leqq 0.8$.

3. The cam follower according to claim 1, wherein a surface treatment of the roller is performed by a flow-barreling.

* * * * *